(12) United States Patent
Kobayashi et al.

(10) Patent No.: US 12,425,266 B2
(45) Date of Patent: Sep. 23, 2025

(54) COMMUNICATION DEVICE, COMMUNICATION SYSTEM, AND COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Nobuyuki Kobayashi, Yokkaichi (JP); Makoto Mashita, Yokkaichi (JP); Masakatsu Moriguchi, Yokkaichi (JP); Takeshi Hagihara, Yokkaichi (JP); Ryo Yamane, Osaka (JP); Ichiro Kanda, Osaka (JP); Tatsuya Izumi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 175 days.

(21) Appl. No.: 18/557,311

(22) PCT Filed: Mar. 18, 2022

(86) PCT No.: PCT/JP2022/012726
§ 371 (c)(1),
(2) Date: May 14, 2024

(87) PCT Pub. No.: WO2022/230447
PCT Pub. Date: Nov. 3, 2022

(65) Prior Publication Data
US 2024/0333553 A1    Oct. 3, 2024

(30) Foreign Application Priority Data
Apr. 30, 2021 (JP) ................. 2021-078007

(51) Int. Cl.
*G06F 15/16* (2006.01)
*H04L 12/40* (2006.01)
*H04L 12/417* (2006.01)

(52) U.S. Cl.
CPC ...... *H04L 12/417* (2013.01); *H04L 12/40019* (2013.01); *H04L 12/40065* (2013.01)

(58) Field of Classification Search
CPC .......... H04L 12/417; H04L 12/40019; H04L 12/40065
(Continued)

(56) References Cited

U.S. PATENT DOCUMENTS

| 5,596,437 A | 1/1997 | Heins |
| 6,680,944 B1 * | 1/2004 | Lym ............ H04L 12/66 370/473 |

(Continued)

FOREIGN PATENT DOCUMENTS

| JP | S60-130944 A | 7/1985 |
| JP | 2004-200878 A | 7/2004 |

(Continued)

OTHER PUBLICATIONS

International Search Report, Application No. PCT/JP2022/012726, mailed Jun. 21, 2022. ISA/Japan Patent Office.

*Primary Examiner* — Moustafa M Meky
(74) *Attorney, Agent, or Firm* — Honigman LLP

(57) ABSTRACT

A first ECU and a plurality of second ECUs are connected to a communication bus. The first ECU repeatedly transmits a beacon signal through the communication bus. Each of the first ECU and the plurality of second ECUs transmits data according to an order set in advance when the beacon signal is transmitted. The first ECU or the second ECU transmits dummy data whose transmission destination is different from the remaining ECUs when there is no transmission data (Continued)

to be transmitted to one of the remaining ECUs other than itself.

6 Claims, 12 Drawing Sheets

(58) Field of Classification Search
 USPC .......................................................... 709/224
 See application file for complete search history.

(56) References Cited

U.S. PATENT DOCUMENTS

| | | | | |
|---|---|---|---|---|
| 6,751,231 | B2* | 6/2004 | Fellman | H04L 12/413 |
| | | | | 370/445 |
| 7,917,719 | B2* | 3/2011 | Elhamias | G06F 13/385 |
| | | | | 711/167 |
| 7,937,508 | B2* | 5/2011 | Dierks, Jr. | G06F 13/385 |
| | | | | 710/33 |
| 7,949,777 | B2* | 5/2011 | Wallace | H04L 12/40071 |
| | | | | 370/282 |
| 9,559,979 | B2* | 1/2017 | Nemeth | H04L 47/781 |
| 9,929,928 | B1* | 3/2018 | Dekoos | H04L 43/106 |
| 10,216,672 | B2* | 2/2019 | Ohba | G06F 13/1673 |
| 11,157,433 | B2* | 10/2021 | Lederman | G06F 13/4063 |
| 2003/0016647 | A1* | 1/2003 | Margon | H04L 12/417 |
| | | | | 370/342 |
| 2004/0086000 | A1* | 5/2004 | Wallace | H04N 21/43615 |
| | | | | 370/282 |
| 2007/0076748 | A1* | 4/2007 | Nakagawa | H04L 12/40091 |
| | | | | 370/466 |
| 2008/0209087 | A1* | 8/2008 | Dierks | G06F 13/385 |
| | | | | 710/33 |
| 2009/0164681 | A1* | 6/2009 | Elhamias | G06F 13/385 |
| | | | | 710/117 |
| 2012/0151108 | A1* | 6/2012 | Soga | G06F 13/36 |
| | | | | 710/110 |
| 2012/0189302 | A1 | 7/2012 | Yuki et al. | |
| 2013/0170505 | A1* | 7/2013 | Nemeth | H04L 12/407 |
| | | | | 370/442 |
| 2017/0185551 | A1* | 6/2017 | Ohba | G06F 13/372 |

FOREIGN PATENT DOCUMENTS

| | | |
|---|---|---|
| JP | 2009-232208 A | 10/2009 |
| JP | 2011-250272 A | 12/2011 |
| JP | 2016-213653 A | 12/2016 |
| WO | 2019-226585 A1 | 11/2019 |

* cited by examiner

FIG. 1
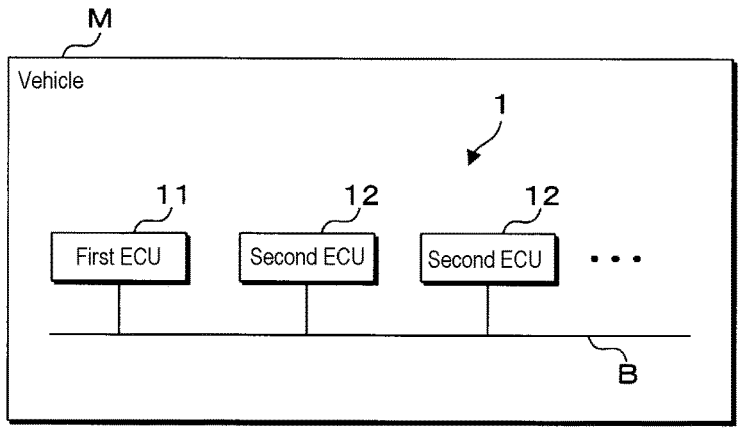
FIG. 2
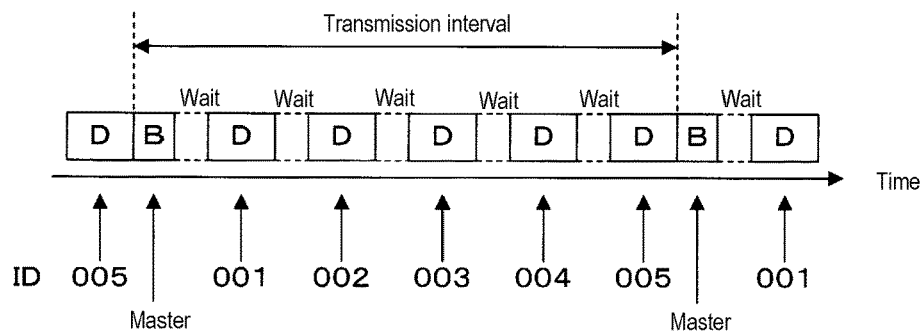
B : Beacon signal
D : Data frame
FIG. 3
| | ID | Roles | Transmission turns |
|---|---|---|---|
| First ECU | 001 | Master | First |
| Second ECU | 002 | Slave | Second |
| Second ECU | 003 | Slave | Third |
| Second ECU | 004 | Slave | Fourth |
| Second ECU | 005 | Slave | Fifth |
FIG. 4
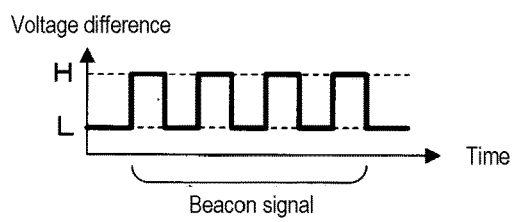

Data frame whose transmission destination is existed->transmission frame
Data frame whose transmission destination is not existed->dummy frame B: Beacon signal
D: Data frame B: Beacon signal
D: Data frame When three ECUs transmit data frames, the transmission interval is equal to or longer than the predetermined interval Two ECUs do not need to transmit dummy frames

FIG. 16

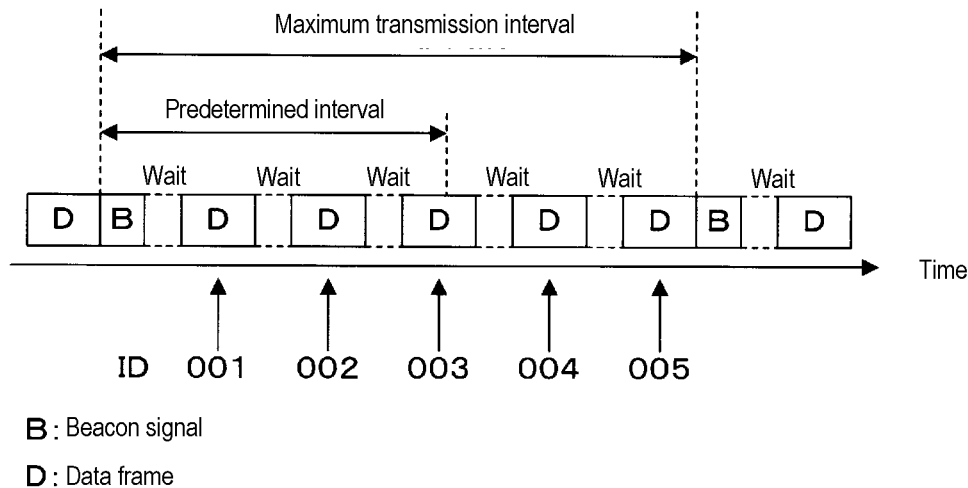

B : Beacon signal
D : Data frame

When P(=3) ECUs transmit data frames, the transmission interval is equal to or longer than the predetermined interval

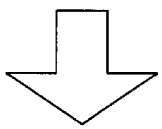

Last P second ECUs adjust the transmission interval so that the transmission interval becomes equal to or longer than the predetermined interval

FIG. 17

| ID | Dummy frame transmission conditions |
|---|---|
| 001 | Not transmit a data frame |
| 002 | Not transmit a data frame |
| 003 | Transmission frame: nothing<br>Number of data frames transmitted: 0 |
| 004 | Transmission frame: nothing<br>Number of data frames transmitted: 1 |
| 005 | Transmission frame: nothing<br>Number of data frames transmitted: 2 |

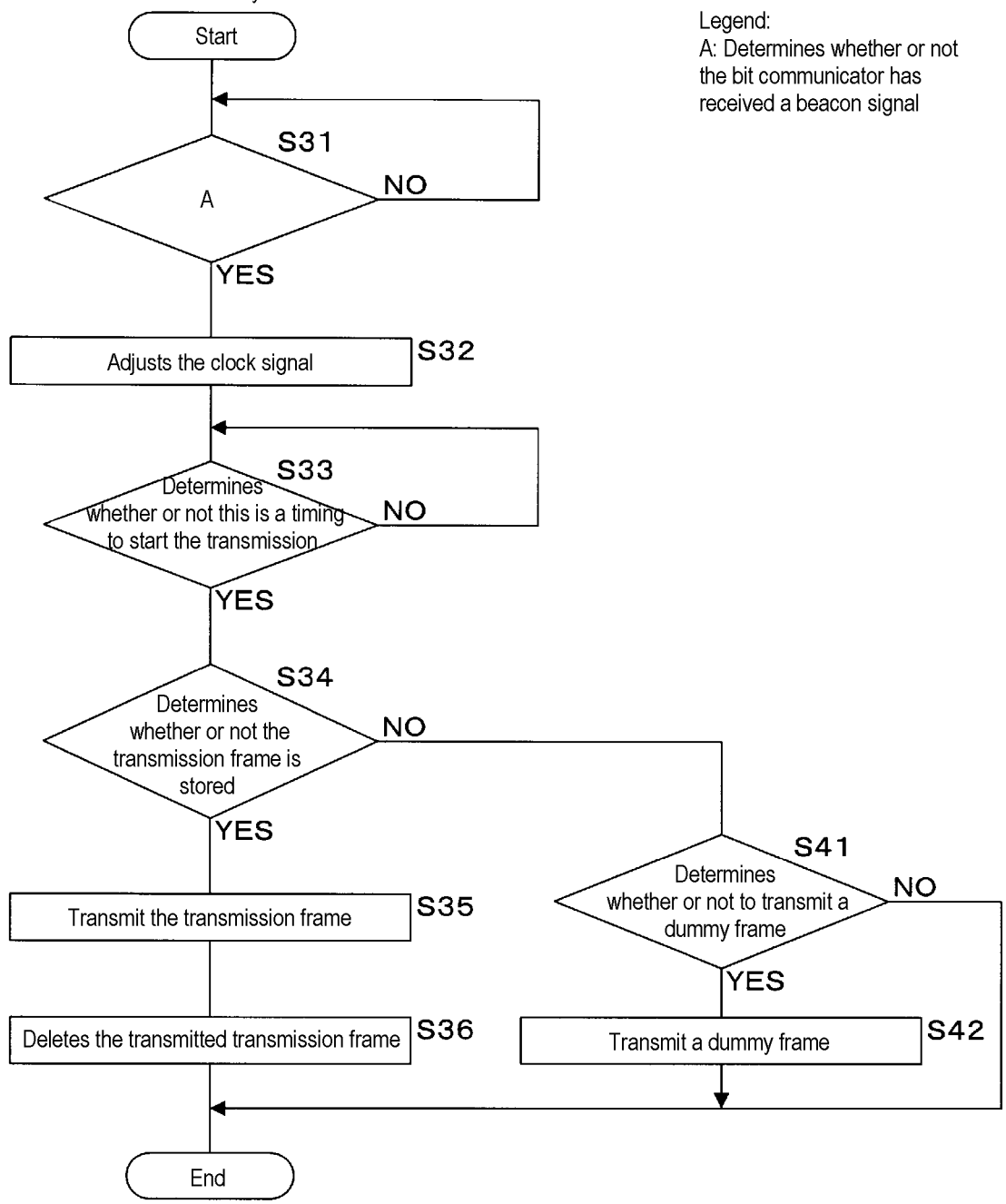

COMMUNICATION DEVICE, COMMUNICATION SYSTEM, AND COMMUNICATION METHOD

CROSS-REFERENCE TO RELATED APPLICATIONS

This application is the U.S. national stage of PCT/JP2022/012726 filed on Mar. 18, 2022, which claims priority of Japanese Patent Application No. JP 2021-078007 filed on Apr. 30, 2021, the contents of which are incorporated herein.

TECHNICAL FIELD

The present disclosure relates to a communication device, a communication system, and a communication method.

BACKGROUND

Japanese Patent Laid-Open Publication No. 2016-213653 discloses a communication system for vehicles in which a plurality of communication devices are connected to a communication bus. Each communication device transmits data to other communication devices through the communication bus.

Data is transmitted by adjusting the voltage of the communication bus each time a period of one bit passes. When the voltage of the communication bus changes, the current value of the current flowing through the communication bus changes, and electromagnetic waves are generated from the communication bus. In a vehicle, various signals are output through conducting wires different from the communication bus. Electromagnetic waves generated from the communication bus act as signal disturbance noise. If the intensity of the disturbance noise is high, the signal may not be read properly.

Therefore, it is an object of the present disclosure to provide a communication device, a communication system, and a communication method capable of preventing the generation of high-intensity disturbance noise.

SUMMARY

A communication device according to an aspect of the present disclosure is a communication device for transmitting data, and includes a transmission unit that is connected to a communication bus to which a plurality of second communication devices are connected and transmits data. An order in which the plurality of second communication devices and the transmission unit transmit data through the communication bus is set in advance. A beacon signal indicating a start of data transmission is repeatedly transmitted through the communication bus. The transmission unit transmits data according to the order when the beacon signal is transmitted. The transmission unit transmits dummy data whose transmission destination is different from the plurality of second communication devices when there is no transmission data to be transmitted to the second communication devices.

A communication system according to an aspect of the present disclosure includes a plurality of communication devices connected to a communication bus. One of the plurality of communication devices repeatedly transmits a beacon signal indicating a start of data transmission through the communication bus. When the beacon signal is transmitted, the plurality of communication devices transmit data through the communication bus according to an order set in advance. At least one of the plurality of communication devices transmits dummy data whose transmission destination is different from the remaining communication devices when there is no transmission data to be transmitted to one of the remaining communication devices other than itself.

A communication method according to an aspect of the present disclosure is a communication method of a communication device for transmitting data. The communication device is connected to a communication bus to which a plurality of second communication devices are connected. An order in which the communication device and a plurality of second communication devices transmit data through the communication bus is set in advance. A beacon signal indicating a start of data transmission is repeatedly transmitted through the communication bus. The communication device executes: a step of transmitting data according to the order when the beacon signal is transmitted; and a step of transmitting dummy data whose transmission destination is different from the plurality of second communication devices when there is no transmission data to be transmitted to the second communication devices.

In addition, not only can the present disclosure be realized as a communication device including such a characteristic processing unit, but also the present disclosure can be realized as a communication method including such characteristic processes as steps or can be realized as a computer program causing a computer to execute such steps. In addition, the present disclosure can be realized as a semiconductor integrated circuit that realizes a part or the entirety of a communication device, or can be realized as a communication system including a communication device.

Effects of Present Disclosure

According to the present disclosure, it is possible to prevent the generation of high-intensity disturbance noise.

BRIEF DESCRIPTION OF DRAWINGS

FIG. 1 is a block diagram showing the main configuration of a communication system according to a first embodiment.

FIG. 2 is an explanatory diagram of a data frame transmission method.

FIG. 3 is a chart showing the IDs, roles, and transmission turns of a first ECU and a plurality of second ECUs.

FIG. 4 is a waveform diagram of a beacon signal.

FIG. 16 is an explanatory diagram of a data frame transmission method according to a third embodiment.

FIG. 17 is a chart showing dummy frame transmission conditions.

FIG. 18 is a flowchart showing the procedure of transmission processing performed by an IC control unit of the second ECU that transmits a dummy frame.

DETAILED DESCRIPTION OF PREFERRED EMBODIMENTS

Figure 5:
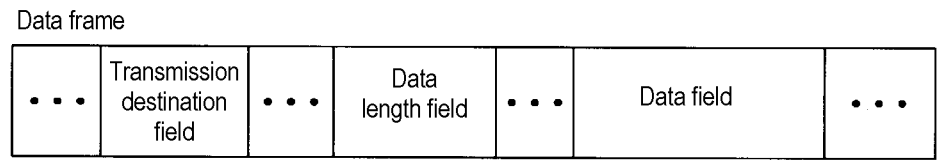
FIG. 5 is an explanatory diagram of the contents of a data frame.

First, embodiments of the present disclosure will be listed and described. At least some of the embodiments described below may be arbitrarily combined.

A communication device according to an aspect of the present disclosure is a communication device for transmitting data, and includes a transmission unit that is connected to a communication bus to which a plurality of second communication devices are connected and transmits data. An order in which the plurality of second communication devices and the transmission unit transmit data through the communication bus is set in advance. A beacon signal indicating a start of data transmission is repeatedly transmitted through the communication bus. The transmission unit transmits data according to the order when the beacon signal is transmitted. The transmission unit transmits dummy data whose transmission destination is different from the plurality of second communication devices when there is no transmission data to be transmitted to the second communication devices.

In the aspect described above, when the beacon signal is transmitted through the communication bus, the transmission unit transmits data through the communication bus according to the order set in advance. When there is no transmission data, the transmission unit transmits dummy data. Therefore, the transmission interval at which the beacon signal is transmitted is long.

In a conventional communication system in which a plurality of communicators are connected to a communication bus, each communicator does not transmit data when there is no data to be transmitted to other communicators. Therefore, the beacon signal transmission interval is short. The beacon signal is transmitted by adjusting the voltage of the communication bus each time a period of one bit passes. When the voltage is changed, disturbance noise is generated. When the beacon signal transmission interval is short, the number of times the voltage of the communication bus is switched per unit time is large. Therefore, the intensity of disturbance noise is high.

However, in the aspect described above, since the beacon signal transmission interval is long, the number of times the voltage of the communication bus is switched per unit time is small. Therefore, since the intensity of disturbance noise is low, the generation of high-intensity disturbance noise is prevented.

In the communication device according to the aspect of the present disclosure, a configuration of the transmission unit conforms to 10BASE-TIS of IEEE802.3cg (IEEE is a registered trademark).

In the aspect described above, the transmission unit transmits a baseband signal with a data rate of 10 Mbps through a twisted wire pair.

The communication device according to the aspect of the present disclosure includes a determination unit that determines whether or not to transmit the dummy data based on a data amount of data transmitted through the communication bus, until a data transmission turn comes after the beacon signal is transmitted, when the transmission data is not present.

In the aspect described above, when the beacon signal transmission interval is equal to or longer than the predetermined interval, the generation of high-intensity disturbance noise is prevented. When there is no transmission data, the transmission unit transmits dummy data as necessary. Therefore, dummy data is efficiently transmitted.

A communication system according to an aspect of the present disclosure includes a plurality of communication devices connected to a communication bus. One of the plurality of communication devices repeatedly transmits a beacon signal indicating a start of data transmission through the communication bus. When the beacon signal is transmitted, the plurality of communication devices transmit data through the communication bus according to an order set in advance. At least one of the plurality of communication devices transmits dummy data whose transmission destination is different from the remaining communication devices when there is no transmission data to be transmitted to one of the remaining communication devices other than itself (at least one of the plurality of communication devices).

In the aspect described above, at least one of the plurality of communication devices connected to the communication bus transmits dummy data when there is no transmission data. Therefore, the beacon signal transmission interval is long. As a result, the generation of high-intensity disturbance noise is prevented.

In the communication system according to the aspect of the present disclosure, each of the plurality of communication devices transmits the dummy data when the transmission data is not present.

In the aspect described above, since all communication devices transmit dummy data, the beacon signal transmission interval is very long. Therefore, the intensity of disturbance noise generated from the communication bus is very low.

In the communication system according to the aspect of the present disclosure, at least one of the plurality of communication devices does not transmit data through the communication bus when the transmission data is not present.

In the aspect described above, one or more communication devices transmit dummy data. The remaining communication devices do not transmit dummy data. It is assumed that when the beacon signal transmission interval is equal to or longer than the predetermined interval, the generation of high-intensity disturbance noise is prevented. Since the beacon signal transmission interval is maintained at a value equal to or greater than the predetermined interval by one or more communication devices, the generation of high-intensity disturbance noise is prevented. When there is no transmission data, the remaining communication devices do not transmit data, for example. In this case, efficient transmission of transmission data can be realized.

A communication method according to an aspect of the present disclosure is a communication method of a communication device for transmitting data. The communication device is connected to a communication bus to which a plurality of second communication devices are connected. An order in which the communication device and a plurality of second communication devices transmit data through the communication bus is set in advance. A beacon signal indicating a start of data transmission is repeatedly transmitted through the communication bus. The communication device executes: a step of transmitting data according to the order when the beacon signal is transmitted; and a step of transmitting dummy data whose transmission destination is different from the plurality of second communication devices when there is no transmission data to be transmitted to the second communication devices.

In the aspect described above, when the beacon signal is transmitted through the communication bus, the communication device transmits data through the communication bus according to the order set in advance. When there is no transmission data, the communication device transmits dummy data. Therefore, since the transmission interval at which the beacon signal is transmitted is long, the number of times the voltage of the communication bus is switched per unit time is small. As a result, since the intensity of disturbance noise is low, the generation of high-intensity disturbance noise is prevented.

Specific examples of communication systems according to embodiments of the present disclosure will be described below with reference to the diagrams. In addition, the present disclosure is not limited to these examples but is defined by the claims, and is intended to include all modifications within the meaning and scope equivalent to the claims.

First Embodiment

Configuration of Communication System

FIG. 1 is a block diagram showing the main configuration of a communication system 1 according to a first embodiment. The communication system 1 is mounted in a vehicle M. The communication system 1 includes a first ECU 11 and a plurality of second ECUs 12. ECU is an abbreviation for Electronic Control Unit. The first ECU 11 and the plurality of second ECUs 12 are connected to a communication bus B.

Electrical devices and sensors are connected to the first ECU 11 and the plurality of second ECUs 12. The electrical devices and the sensors are not shown. Each sensor detects a value related to the vehicle, and outputs the detected detection value to the first ECU 11 or the second ECU 12 connected to the sensor. For example, when the detection value of the sensor is input, each of the first ECU 11 and the plurality of second ECUs 12 transmits a data frame including the sensor detection value as main data through the communication bus B. The data frame indicates a transmission destination. In addition, the main data is not limited to the detection value of the sensor.

When one ECU connected to the communication bus B transmits a data frame, all ECUs connected to the communication bus B receive the data frame. When the data frame is received, each of the first ECU 11 and the plurality of second ECUs 12 discards the received data frame if the transmission destination of the data frame is not itself.

When the data frame is received, each of the first ECU 11 and the plurality of second ECUs 12 determines an operation, which is to be performed by an electrical device connected to itself, based on the main data included in the received data frame if the transmission destination of the data frame is itself. When the operation to be performed by the electrical device is determined, each of the first ECU 11 and the plurality of second ECUs 12 outputs an operation signal indicating the determined operation to the electrical device. When the operation signal is input to the electrical device, the electrical device performs the operation indicated by the input operation signal.

Data Frame Transmission Method

FIG. 2 is an explanatory diagram of a data frame transmission method. FIG. 3 is a chart showing the IDs, roles, and transmission turns of the first ECU 11 and the plurality of second ECUs 12. ID is an abbreviation for Identification Data. FIGS. 2 and 3 show an example in which the first ECU 11 and the four second ECUs 12 transmit data frames.

When another ECU transmits a data frame through the communication bus B while one ECU among the first ECU 11 and the plurality of second ECUs 12 is transmitting a data frame through the communication bus B, a plurality of data frames collide. If a plurality of data frames collide, the transmissions of the data frames fail. Therefore, in order to avoid the collision of a plurality of data frames, each of the first ECU 11 and the second ECU 12 transmits a data frame according to, for example, a PLCA (Physical Layer Collision Avoidance) method.

As shown in FIG. 2, in the PLCA method, a beacon signal is repeatedly transmitted through the communication bus B. When the beacon signal is transmitted, five data frames are transmitted through the communication bus B. The beacon signal indicates the start of transmission of a data frame. The beacon signal is transmitted from an ECU serving as a master. As shown in FIG. 3, the first ECU 11 serves as a master. Therefore, the first ECU 11 repeatedly transmits the beacon signal through the communication bus B. Each of the plurality of second ECUs 12 serves as a slave.

When the first ECU 11 transmits a beacon signal, the first ECU 11 and the plurality of second ECUs 12 transmit data frames according to an order set in advance. As shown in FIG. 3, an ID is assigned in advance to each of the first ECU 11 and the plurality of second ECUs 12. In the example of FIG. 3, the ID of the first ECU 11 is 001. One of 002 to 005 is assigned to each of the four second ECUs 12. In FIG. 3, the transmission turns of 001 to 005 are set to first to fifth, respectively. The transmission turn of the master is the first.

When the first ECU 11 transmits a beacon signal, first, the first ECU 11 with an ID of 001 transmits a data frame. Then, the second ECU 12 with an ID of 002 transmits a data frame. Thereafter, the three second ECUs 12 corresponding to 003 to 005 sequentially transmit data frames. The first ECU 11 transmits the beacon signal again when the second ECU 12 with an ID of 005 ends the transmission of the data frame.

The first ECU 11 waits until a predetermined period passes from the transmission of the beacon signal. The first ECU 11 transmits a data frame when the predetermined period has passed. Each second ECU 12 waits until the predetermined period passes from the end of the transmission of the data frame. Each second ECU 12 transmits a data frame when the predetermined period has passed. Each of the first ECU 11 and the second ECU 12 functions as a communication device or a second communication device.

In addition, when the number of second ECUs 12 is not 4, the plurality of second ECUs 12 sequentially transmit data frames after the first ECU 11 transmits the data frame, as in the case where the number of second ECUs 12 is 4.

In addition to the PLCA method, a CSMA/CD (Carrier Sense Multiple Access/Collision Detection) method can be used as a method of communication through a communication bus. In the CSMA/CD method, each of a plurality of ECUs transmits a data frame through the communication bus as in the PLCA method. When a plurality of data frames collide, each ECU detects the collision of the plurality of data frames. Each of the plurality of ECUs that are transmission sources of the plurality of data frames that have collide with each other retransmits the data frame. The timings at which a plurality of ECUs transmit data frames are different from each other. Therefore, the collision of a plurality of data frames is avoided.

In the CSMA/CD method, when a plurality of data frames collide, the delay time of the data frames caused by the collision is not defined. However, in the PLCA method, a period of transmitting the data frame is assigned to each of the first ECU 11 and the plurality of second ECUs 12. For this reason, the collision of data frames does not occur. As a result, in the PLCA method, it is possible to guarantee the maximum delay time. If the maximum delay time is guaranteed, it is easy to design an in-vehicle network.

Beacon Signal

FIG. 4 is a waveform diagram of a beacon signal. The vertical and horizontal axes of FIG. 4 indicate the voltage difference and time, respectively. The waveform of the beacon signal shown in FIG. 4 is an example. The communication bus B includes a first conducting wire W1 and a second conducting wire W2 (see FIG. 7). The first conducting wire W1 and the second conducting wire W2 are twisted together. Therefore, a twisted wire pair is realized. The beacon signal has a plurality of bits. Each of the first ECU 11 and the plurality of second ECUs 12 transmits a beacon signal by adjusting the voltage difference between the first conducting wire W1 and the second conducting wire W2 included in the communication bus B to a high level voltage or a low level voltage each time a period of one bit passes. In FIG. 4, H and L indicate high a level voltage and a low level voltage, respectively.

Each of the first ECU 11 and the plurality of second ECUs 12 transmit a data frame by adjusting the voltage difference between the first conducting wire W1 and the second conducting wire W2 included in the communication bus B to a high level voltage or a low level voltage each time a period of one bit passes.

Each bit indicates a high level voltage or a low level voltage. In the example of FIG. 4, the beacon signal has seven bits. In the beacon signal shown in FIG. 4, a high level voltage and a low level voltage are alternately output. In addition, the number of bits forming the beacon signal is not limited to seven.

The waveform of the beacon signal is set in advance. When the first ECU 11 transmits a beacon signal through the communication bus B, all the second ECUs 12 receive the beacon signal. In each second ECU 12, a clock signal formed by the high level voltage and the low level voltage is output. In the clock signal, voltage rise or fall is periodically performed. The voltage rise is a switch from the low level voltage to the high level voltage. The voltage fall is a switch from the high level voltage to the low level voltage. When the beacon signal is received, each second ECU 12 adjusts the rising or falling time of the clock signal. Each of the second ECUs 12 adjusts the rising or falling time to the end time of the beacon signal, for example.

Here, in a configuration in which processing is performed at the rising time of the clock signal, the rising time of the clock signal is adjusted. In a configuration in which processing is performed at the falling time of the clock signal, the falling time of the clock signal is adjusted.

Each second ECU 12 adjusts the rising or falling time of the clock signal, thereby realizing synchronization between the first ECU 11 and the plurality of second ECUs 12. As a result, the timings at which the first ECU 11 and the plurality of second ECUs 12 perform processes substantially match each other. In addition, the waveform of the beacon signal is not limited to the waveform shown in FIG. 4.

Contents of Data Frame

FIG. 5 is an explanatory diagram of the contents of a data frame. A data frame includes a transmission destination field, a data length field, and a data field. A data frame is data and has a plurality of bits. Each bit outputs a high level voltage or a low level voltage. Bit values of 1 and 0 respectively correspond to a high level voltage and a low level voltage, for example.

The transmission destination field of the data frame indicates the transmission destination of the data frame. For example, an ID is shown in the transmission destination field. The data field of the data frame includes main data. As described above, the main data indicates, for example, a detection value of a sensor. The data length field of the data frame indicates the length of the main data. The unit of the length of the main data is a bit.

Regarding the data frame, the number of bits forming a portion other than the data field is fixed. Once the length of the main data is determined, the length of the data frame is determined. The number of bits forming the main data changes. However, the upper limit of the number of bits forming the main data is set in advance.

Each of the first ECU 11 and the plurality of second ECUs 12 transmits a data frame whose transmission destination is a remaining ECU other than the transmission source among the ECUs connected to the communication bus B. Hereinafter, this data frame is referred to as a transmission frame. The transmission frame corresponds to transmission data.

As shown in FIG. 3, when five IDs are assigned, the transmission destination of a transmission frame transmitted from the first ECU 11 with an ID of 001 is one of the four second ECUs 12 corresponding to 002 to 005. In a similar case, the transmission destination of a transmission frame transmitted from the second ECU 12 with an ID of 002 is one of the first ECU 11 corresponding to 001 and the three second ECUs 12 corresponding to 003 to 005.

Each of the first ECU 11 and the plurality of second ECUs 12 further transmits a data frame whose transmission destination is not the ECUs connected to the communication bus B. Hereinafter, this data frame is referred to as a dummy frame. The dummy frame corresponds to dummy data. That is, dummy data is data that does not have a transmission destination.

As shown in FIG. 3, when five IDs are assigned, the transmission destination of the dummy frame is different from any of the first ECU 11 corresponding to 001 and the four second ECUs 12 corresponding to 002 to 005. The transmission destination of the dummy frame is, for example, an ECU with an ID of 999.

As described above, when the data frame is received, each of the first ECU 11 and the plurality of second ECUs 12 discards the received data frame if the transmission destination of the data frame is different from itself. Therefore, when a dummy frame is transmitted, each of the first ECU 11 and the plurality of second ECUs 12 discards the received dummy frame.

As described above, there is no transmission destination of the dummy frame among the ECUs connected to the communication bus B. Therefore, the transmission destination of the dummy frame is different from any of the remaining ECUs connected to the communication bus B other than the transmission source.

Configuration of First ECU 11

Figure 6:
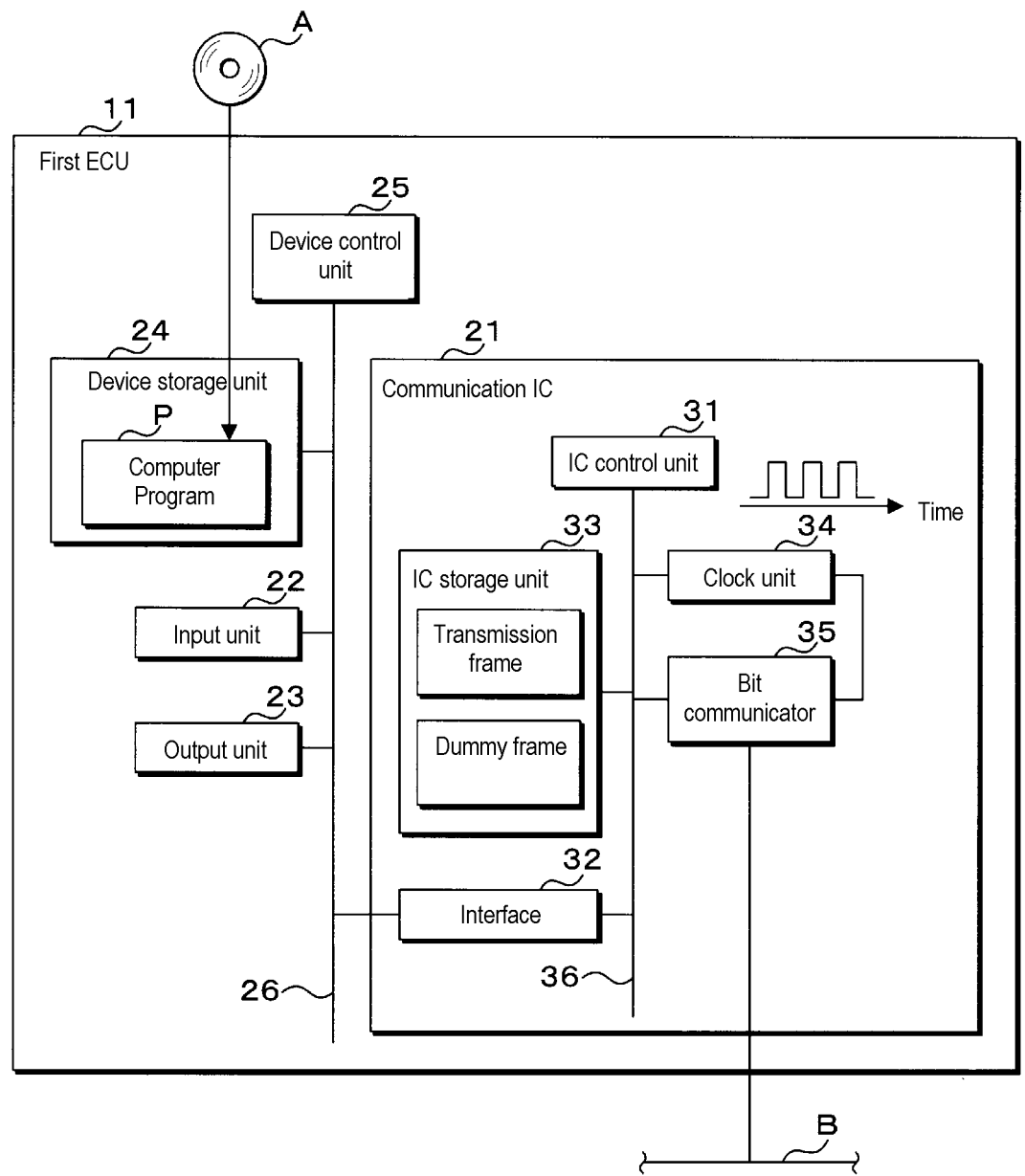
FIG. 6 is a block diagram showing the main configuration of the first ECU.

FIG. 6 is a block diagram showing the main configuration of the first ECU 11. The first ECU 11 includes a communication IC 21, an input unit 22, an output unit 23, a device storage unit 24, and a device control unit 25. IC is an abbreviation for Integrated Circuit. The communication IC 21, the input unit 22, the output unit 23, the device storage unit 24, and the device control unit 25 are connected to a device bus 26. The communication IC 21 is further connected to the communication bus B. The input unit 22 is further connected to a sensor. The output unit 23 is further connected to an electrical device. The electrical device and the sensor are not shown.

The sensor outputs the detection value to the input unit 22. For example, when a sensor detection value is input to the input unit 22, the device control unit 25 generates a transmission frame including the sensor detection value as main data. The device control unit 25 provides the generated transmission frame to the communication IC 21. When the transmission frame is provided, the communication IC 21 transmits the given transmission frame through the communication bus B.

The communication IC 21 receives the data frame transmitted through the communication bus B. When the data frame is received, the communication IC 21 discards the received data frame if the transmission destination of the received data frame is different from the first ECU 11. Therefore, when a dummy frame is received, the communication IC 21 discards the received dummy frame.

When the data frame is received, the communication IC 21 provides the received data frame to the device control unit 25 when the transmission destination of the received data frame is the first ECU 11. In other words, when the communication IC 21 receives a transmission frame whose transmission destination is itself, the communication IC 21 provides the received transmission frame to the device control unit 25.

When the received transmission frame is provided, the device control unit 25 determines an operation to be performed by the electrical device based on the main data of the provided transmission frame. When the operation to be performed by the electrical device is determined, the device control unit 25 instructs the output unit 23 to output an operation signal indicating the determined operation to the electrical device. As described above, when the operation signal is input, the electrical device performs the operation indicated by the input operation signal.

The device storage unit 24 is, for example, a non-volatile memory. A computer program P is stored in the device storage unit 24. The device control unit 25 includes a processing element that performs processing, for example, a CPU (Central Processing Unit). The processing element of the device control unit 25 executes the computer program P to perform transmission frame generation processing and signal output processing in parallel. In the transmission frame generation processing, the device control unit 25 generates a transmission frame as described above and provides the generated transmission frame to the communication IC 21. In the signal output processing, the device control unit 25 instructs the output unit 23 to output an operation signal as described above.

In addition, the computer program P may be provided to the first ECU 11 by using a non-temporary storage medium A in which the computer program P is recorded in a readable manner. The storage medium A is, for example, a portable memory. Examples of the portable memory include a CD-ROM, a USB (Universal Serial Bus) memory, an SD card, a micro SD card, and a compact flash (registered trademark). If the storage medium A is a portable memory, the processing element of the device control unit 25 may read the computer program P from the storage medium A by using a reader (not shown). The read computer program P is stored in the device storage unit 24. In addition, the computer program P may be provided to the first ECU 11 by a communication unit (not shown) of the first ECU 11 communicating with an external device. In this case, the processing element of the device control unit 25 acquires the computer program P through the communication unit. The acquired computer program P is stored in the device storage unit 24.

Configuration of Communication IC 21

The communication IC 21 includes an IC control unit 31, an interface 32, an IC storage unit 33, a clock unit 34, and a bit communicator 35. These are connected to an IC bus 36. The interface 32 is further connected to the device bus 26. The clock unit 34 is further connected to the bit communicator 35. The bit communicator 35 is further connected to the communication bus B.

The device control unit 25 provides a transmission frame to the IC control unit 31 through the interface 32. The IC control unit 31 includes a processing element that performs processing, for example, a CPU. When the transmission frame is provided, the IC control unit 31 writes the provided transmission frame in the IC storage unit 33. The IC storage unit 33 is, for example, a non-volatile memory. A dummy frame is stored in advance in the IC storage unit 33.

The clock unit 34 outputs a clock signal to the bit communicator 35. The IC control unit 31 provides the transmission frame or the dummy frame stored in the IC storage unit 33 to the bit communicator 35 bit by bit. The IC control unit 31 provides a beacon signal to the bit communicator 35 bit by bit.

The bit communicator 35 transmits a one-bit signal or one-bit data provided from the IC control unit 31 each time the clock signal rises. The bit communicator 35 transmits a one-bit signal or one-bit data by adjusting the voltage difference between the first conducting wire W1 and the second conducting wire W2 included in the communication bus B to a high level voltage or a low level voltage. The voltage difference is maintained at the high level voltage or the low level voltage during one period of the clock signal. The period of the clock signal corresponds to the period of one bit.

The bit communicator 35 receives a one-bit signal or one-bit data by detecting the voltage difference between the first conducting wire W1 and the second conducting wire W2 included in the communication bus B each time the clock signal rises. The bit communicator 35 notifies the IC control unit 31 of the received one-bit signal or one-bit data.

In addition, the bit communicator 35 may transmit the one-bit data provided from the IC control unit 31 each time the clock signal falls. The bit communicator 35 may receive a one-bit signal or one-bit data by detecting the voltage difference of the communication bus B each time the clock signal falls.

When the bit communicator 35 receives the data frame, the IC control unit 31 discards the received data frame if the transmission destination of the received data frame is not the first ECU 11. Therefore, when the bit communicator 35 receives a dummy frame, the IC control unit 31 discards the received dummy frame. When the bit communicator 35 receives the data frame, if the transmission destination of the received data frame is the first ECU 11, the IC control unit 31 provides the received data frame to the device control unit 25 through the interface 32. As described above, the data frame provided to the device control unit 25 by the IC control unit 31 provides is a transmission frame.

A computer program (not shown) is stored in the IC storage unit 33. The IC control unit 31 performs writing processing, transmission processing, and reception processing in parallel by executing the computer program. In the writing processing, the IC control unit 31 writes the transmission frame in the IC storage unit 33 as described above. In the transmission processing, the IC control unit 31 causes the bit communicator 35 to transmit a beacon signal. After causing the bit communicator 35 to transmit the beacon signal, the IC control unit 31 causes the bit communicator 35 to transmit a transmission frame or a dummy frame. In the reception processing, the IC control unit 31 performs processing related to the data frame received by the bit communicator 35 as described above.

Configuration of Bit Communicator 35

Figure 7:
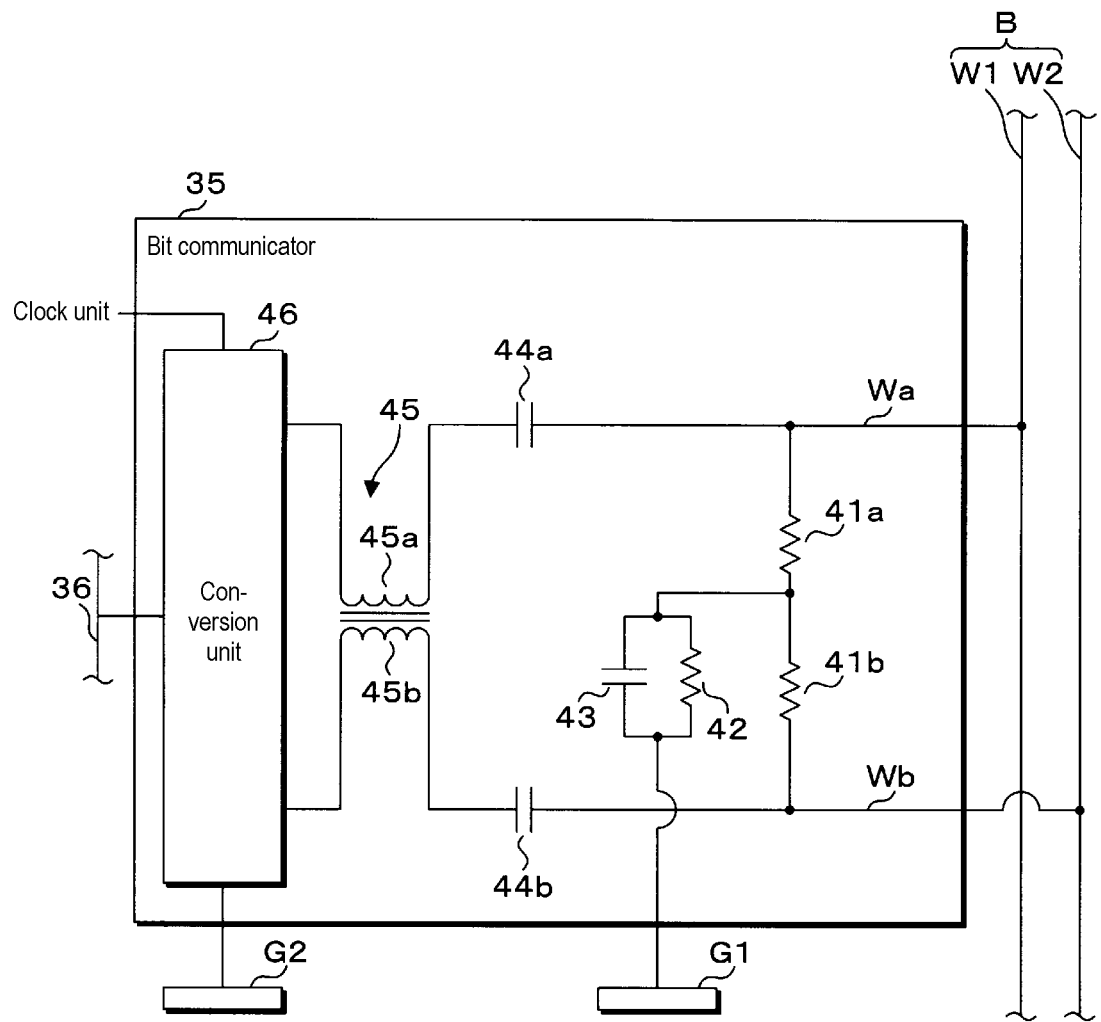
FIG. 7 is a circuit diagram of a bit communicator.

FIG. 7 is a circuit diagram of the bit communicator 35. The bit communicator 35 includes three resistors 41a, 41b, and 42, three capacitors 43, 44a, and 44b, a common mode choke coil 45, and a conversion unit 46. The common mode choke coil 45 includes a first inductor 45a, a second inductor 45b, and an annular magnetic body. Each of the first inductor 45a and the second inductor 45b is wound around the magnetic body.

The conversion unit 46 of the bit communicator 35 is connected to the first conducting wire W1 of the communication bus B by a device conducting wire Wa. The conversion unit 46 of the bit communicator 35 is connected to the second conducting wire W2 of the communication bus B by a device conducting wire Wb. The conversion unit 46 is further connected to the clock unit 34 and the IC bus 36.

The capacitor 44a and the first inductor 45a of the common mode choke coil 45 are arranged in the middle of the device conducting wire Wa. The capacitor 44a is arranged on the first conducting wire W1 side of the first inductor 45a. Similarly, the capacitor 44b and the second inductor 45b of the common mode choke coil 45 are arranged in the middle of the device conducting wire Wb. The capacitor 44b is arranged on the second conducting wire W2 side of the second inductor 45b.

On the first conducting wire W1 side of the capacitor 44a, one end of the resistor 41a is connected to the device conducting wire Wa. Similarly, on the second conducting wire W2 side of the capacitor 44b, one end of the resistor 41b is connected to the device conducting wire Wb. The other end of the resistor 41a is connected to the other end of the resistor 41b. A connection node between the resistors 41a and 41b is connected to one end of the resistor 42 and one end of the capacitor 43. The other ends of the resistor 42 and the capacitor 43 are connected to a first conductor G1. The first conductor G1 is arranged in the first ECU 11.

The resistors 41a, 41b, and 42 and the capacitor 43 function as a terminating circuit to suppress reflection of a signal or data represented by the voltage difference between the first conducting wire W1 and the second conducting wire W2. The two capacitors 44a and 44b remove DC components from the two voltages input from the two device conducting wires Wa and Wb. The capacitors 44a and 44b output two voltages, from which DC components have been removed, to the common mode choke coil 45.

The common mode choke coil 45 removes common mode noise from the two voltages output from the capacitors 44a and 44b and outputs two voltages, from which the common mode noise has been removed, to the conversion unit 46.

The conversion unit 46 detects a voltage difference between the two voltages input from the common mode choke coil 45 each time the clock signal input from the clock unit 34 rises or falls. When the voltage difference is detected, the conversion unit 46 outputs a bit value corresponding to the detected voltage difference to the IC control unit 31. The bit value is 0 or 1. For example, if the voltage difference is a low level voltage, 0 is output as a bit value. If the voltage difference is a high level voltage, 1 is output as a bit value. The bit value is represented by a voltage whose reference potential is the potential of a second conductor G2. Bit values of 1 and 0 respectively correspond to a high level voltage and a low level voltage whose reference potential is the second conductor G2, for example. The second conductor G2 is arranged inside the first ECU 11, and is different from the first conductor G1.

As described above, the bit communicator 35 transmits a one-bit signal or one-bit data. The IC control unit 31 provides the one-bit signal or one-bit data to the conversion unit 46. The conversion unit 46 adjusts the voltage difference between the two device conducting wires Wa and Wb to a voltage corresponding to the one-bit signal or one-bit data provided from the IC control unit 31 each time the clock signal input from the clock unit 34 rises or falls.

The two voltages output from the conversion unit 46 are input to the common mode choke coil 45. The common mode choke coil 45 removes common mode noise from the two voltages output from the conversion unit 46 and outputs two voltages, from which the common mode noise has been removed, to the two capacitors 44a and 44b. The two capacitors 44a and 44b remove DC components from the two voltages input from the common mode choke coil 45. The capacitors 44a and 44b apply two voltages, from which DC components have been removed, to the first conducting wire W1 and the second conducting wire W2 of the communication bus B, respectively. As a result, the voltage difference between the first conducting wire W1 and the second conducting wire W2 is adjusted to a high level voltage or a low level voltage.

The configuration of the bit communicator 35 conforms to 10BASE-TIS of IEEE802.3cg. Therefore, the bit communicator 35 is configured to realize the transmission of a baseband signal with a data rate of 10 Mbps. Here, the baseband signal is transmitted through a twisted wire pair including the first conducting wire W1 and the second conducting wire W2. IEEE is a registered trademark, and is an abbreviation for Institute of Electrical and Electronics Engineers.

Configuration of Second ECU 12

In the configuration of the second ECU 12, other components excluding the components related to the transmission of the beacon signal are configured in the same manner as in the first ECU 11. In the description of the configuration of the first ECU 11, the first ECU 11 is replaced with the second ECU 12. In this manner, the configuration of the second ECU 12 can be explained.

In the second ECU 12, the IC control unit 31 does not provide the beacon signal to the bit communicator 35. The bit communicator 35 receives a beacon signal. When the beacon signal is received, the IC control unit 31 adjusts the rising or falling time of the clock signal based on the received beacon signal, as described in the description of the beacon signal. In a configuration in which processing is performed at the rising time of the clock signal, the rising time of the clock signal is adjusted. In a configuration in which processing is performed at the falling time of the clock signal, the falling time of the clock signal is adjusted.

Similarly to the IC control unit 31 of the first ECU 11, the IC control unit 31 of the second ECU 12 performs writing processing, transmission processing, and reception processing. However, in the transmission processing of the second ECU 12, the IC control unit 31 adjusts the clock signal based on the beacon signal received by the bit communicator 35 and then causes the bit communicator 35 to transmit a transmission frame or a dummy frame.

Procedure for Transmitting Data Frame

Figure 8:
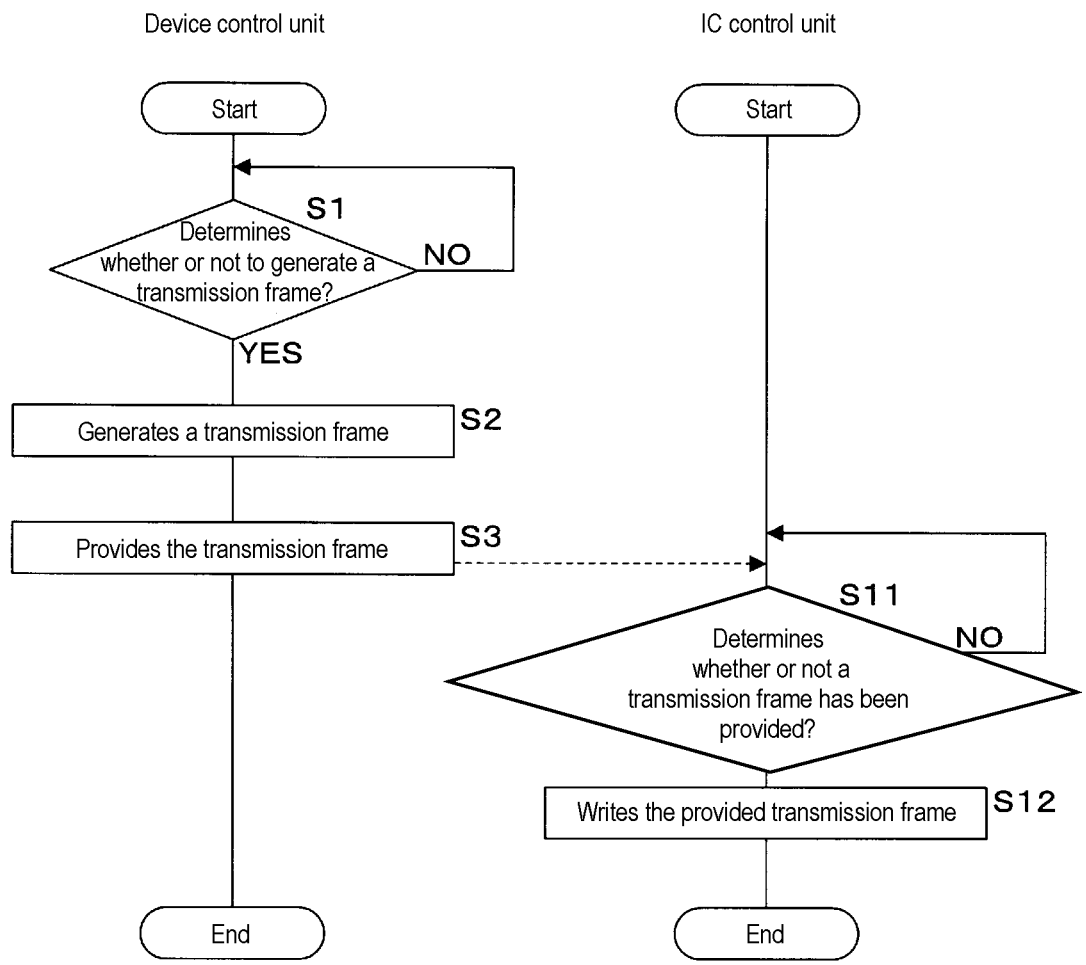
FIG. 8 is a flowchart showing a procedure for preparing for transmission of a transmission frame.

FIG. 8 is a flowchart showing a procedure for preparing for transmission of a transmission frame. In the first ECU 11 and the second ECUs 12, preparation for transmission of the transmission frame is performed in the same manner. FIG. 8 shows transmission frame generation processing of the device control unit 25 and writing processing of the IC control unit 31.

In the transmission frame generation processing, first, the device control unit 25 determines whether or not to generate a transmission frame (step S1). In step S1, for example, when a detection value of a sensor is input to the input unit 22, the device control unit 25 determines that a transmission frame is to be generated. In this case, the main data of the transmission frame is the sensor detection value input to the input unit 22. When it is determined that no transmission frame is to be generated (S1: NO), the device control unit 25 executes step S1 again and waits until the timing to generate a transmission frame arrives.

When it is determined that a transmission frame is to be generated (S1: YES), the device control unit 25 generates a transmission frame (step S2). For example, each time step S2 is executed, the device control unit 25 may always generate a transmission frame having a predetermined data length. The predetermined length is, for example, the upper limit of the number of bits forming the data field of the data frame. When the data length is fixed, the number of bits forming the transmission frame generated by the device control unit 25 is always constant. In a configuration in which a transmission frame having a predetermined data length is generated, the data length of a dummy frame may also be the predetermined length. In this case, the number of bits forming the dummy frame is the same as the number of bits forming the transmission frame.

Then, the device control unit 25 provides the transmission frame generated in step S2 to the IC control unit 31 through the interface 32 (step S3). After executing step S3, the device control unit 25 ends the transmission frame generation processing. After the transmission frame generation processing ends, the device control unit 25 performs the transmission frame generation processing again.

In the writing processing, first, the IC control unit 31 determines whether or not a transmission frame has been provided from the device control unit 25 (step S11). When it is determined that no transmission frame has been provided (S11: NO), the IC control unit 31 executes step S11 again and waits until the transmission frame is provided from the device control unit 25.

When it is determined that the transmission frame has been provided from the device control unit 25 (S11: YES), the IC control unit 31 writes the provided transmission frame in the IC storage unit 33 (step S12). After executing step S12, the IC control unit 31 ends the writing processing. After the writing processing ends, the IC control unit 31 performs the writing processing again.

As described above, when the device control unit 25 generates a transmission frame, the generated transmission frame is written in the IC storage unit 33. The transmission frame stored in the IC storage unit 33 is transmitted through the communication bus B.

Figure 9:
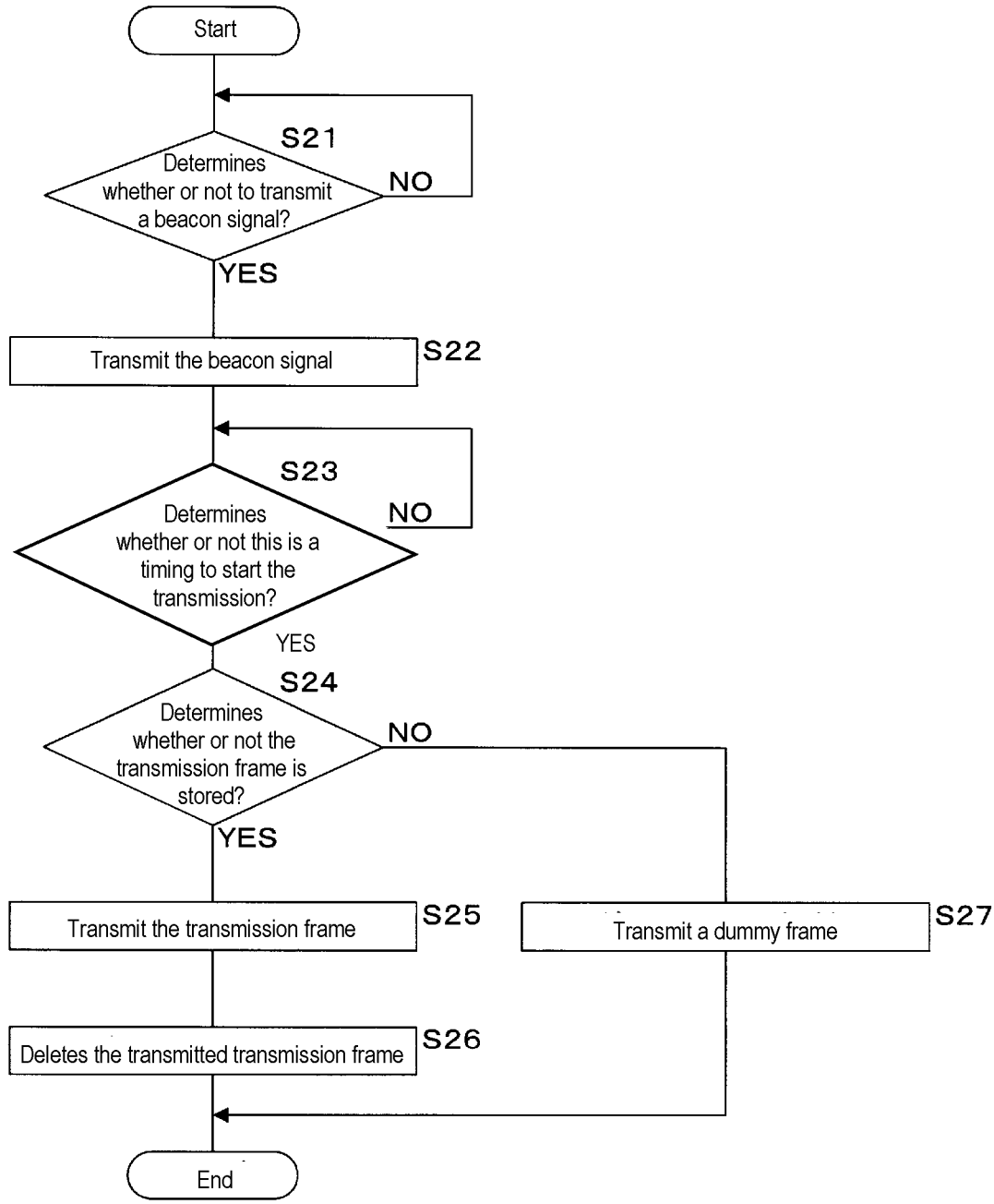
FIG. 9 is a flowchart showing the procedure of transmission processing performed by an IC control unit of the first ECU.

FIG. 9 is a flowchart showing the procedure of transmission processing performed by the IC control unit 31 of the first ECU 11. In the transmission processing, first, the IC control unit 31 determines whether or not to transmit a beacon signal (step S21). The timing at which the beacon signal is transmitted is a timing at which the second ECU 12 whose turn is the last ends the transmission of the data frame. As described above, in the data length field of the data frame, the data length of the main data is shown. The IC control unit 31 can grasp the timing at which the transmission of the data frame ends based on the data length shown in the data length field of the data frame that is being transmitted from the second ECU 12 whose turn is the last.

When it is determined that no beacon signal is to be transmitted (S21: NO), the IC control unit 31 executes step S21 again and waits until the timing to transmit the beacon signal arrives. When it is determined that the beacon signal is to be transmitted (S21: YES), the IC control unit 31 instructs the bit communicator 35 to transmit the beacon signal through the communication bus B (step S22). As described above, in the second ECU 12, when the bit communicator 35 receives the beacon signal, the IC control unit 31 adjusts the clock signal.

After executing step S22, the IC control unit 31 determines whether or not this is a timing to start the transmission of a data frame (step S23). Since the first ECU 11 serves as a master, the transmission turn of the first ECU 11 is the first. In this case, in step S23, the IC control unit 31 determines whether or not a predetermined period has passed from the end of the transmission of the beacon signal. The timing at which the predetermined period has passed is a timing at which transmission is started. When it is determined that this is not the timing to start transmission (S23: NO), the IC control unit 31 executes step S23 again and waits until the timing to start transmission arrives.

When it is determined that this is the timing to start transmission (S23: YES), the IC control unit 31 determines whether or not the transmission frame is stored in the IC storage unit 33 (step S24). When it is determined that the transmission frame is stored in the IC storage unit 33 (S24: YES), the IC control unit 31 instructs the bit communicator 35 to transmit the transmission frame stored in the IC storage unit 33 bit by bit (step S25). The bit communicator 35 functions as a transmission unit. After executing step S25, the IC control unit 31 deletes the transmitted transmission frame from the IC storage unit 33 (step S26).

When it is determined that no transmission frame is stored in the IC storage unit 33 (S24: NO), the IC control unit 31 instructs the bit communicator 35 to transmit a dummy frame stored in the IC storage unit 33 bit by bit (step S27). After executing one of steps S26 and S27, the IC control unit 31 ends the transmission processing. After the transmission processing ends, the IC control unit 31 performs the transmission processing again.

Figure 10:
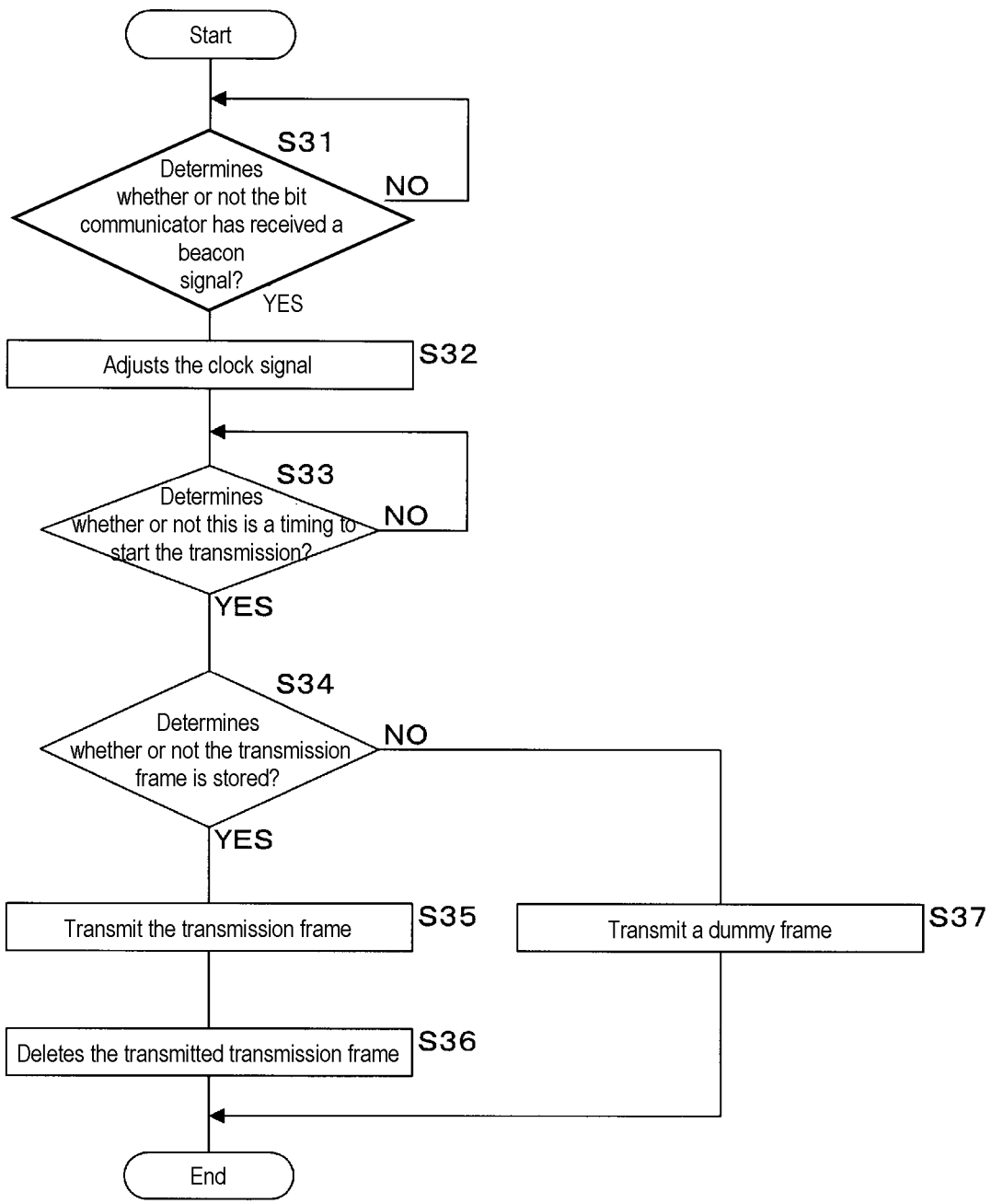
FIG. 10 is a flowchart showing the procedure of transmission processing performed by an IC control unit of the second ECU.

FIG. 10 is a flowchart showing the procedure of transmission processing performed by the IC control unit 31 of the second ECU 12. Steps S34 to S37 of the transmission processing performed by the IC control unit 31 of the second ECU 12 are the same as steps S24 to S27 of the transmission processing performed by the IC control unit 31 of the first ECU 11. Therefore, the description of steps S34 to S37 will be omitted.

In the transmission processing, first, the IC control unit 31 of the second ECU 12 determines whether or not the bit communicator 35 has received a beacon signal (step S31). When it is determined that the bit communicator 35 has not received the beacon signal (S31: NO), the IC control unit 31 executes step S31 again and waits until the bit communicator 35 receives the beacon signal.

When it is determined that the bit communicator 35 has received the beacon signal (S31: YES), the IC control unit 31 adjusts the clock signal output from the clock unit 34 (step S32). In step S32, the IC control unit 31 adjusts the rising or falling time of the clock signal as described above. After executing step S32, the IC control unit 31 determines whether or not this is a timing to start the transmission of a data frame (step S33).

When the turns of transmission are assigned as shown in FIG. 3, in step S33, the IC control unit 31 determines whether or not a predetermined period has passed from the end of the transmission of the data frame from the first ECU 11 or the second ECU 12 with an immediately preceding turn. The timing at which the predetermined period has passed is a timing at which transmission is started. For the second ECU 12 with an ID of 002, an ECU with an immediately preceding turn is the first ECU 11 with an ID of 001. For the second ECU 12 with an ID of 003, an ECU with an immediately preceding turn is the second ECU 12 with an ID of 002.

The IC control unit 31 can grasp the timing at which the first ECU 11 or the second ECU 12 ends the transmission of the data frame based on the data length shown in the data length field of the data frame that is being transmitted from the first ECU 11 or the second ECU 12 with an immediately preceding turn.

When it is determined that this is not the timing to start the transmission of the data frame (S33: NO), the IC control unit 31 executes step S33 and waits until the timing to start the transmission of the data frame arrives. When it is determined that this is the timing to start the transmission of the data frame (S33: YES), the IC control unit 31 executes step S34. After the transmission processing ends, the IC control unit 31 performs the transmission processing again.

As described above, the bit communicator 35 of each of the first ECU 11 and the plurality of second ECUs 12 transmits a dummy frame when there is no transmission frame, which is to be transmitted to other ECUs different from itself, in the IC storage unit 33. Therefore, the bit communicator 35 of each of the first ECU 11 and the plurality of second ECUs 12 always transmits a transmission frame or a dummy frame when the turn of transmission comes.

In addition, for the first ECU 11 and the plurality of second ECUs 12, the order of transmitting data frames is set in advance as shown in FIG. 3. Therefore, when the beacon signal is transmitted, the bit communicator 35 of each of the first ECU 11 and the plurality of second ECUs 12 transmits the data frame through the communication bus B according to the order set in advance.

Effects of Communication System 1

Figure 11:
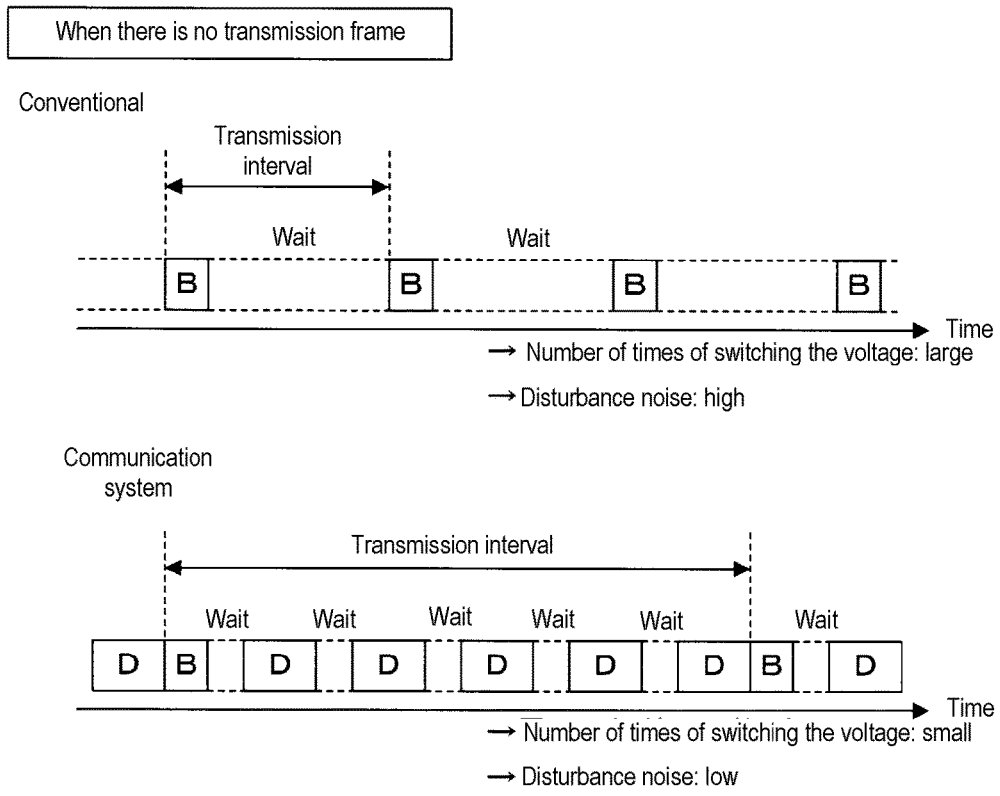
FIG. 11 is an explanatory diagram of the effects of the communication system.

FIG. 11 is an explanatory diagram of the effects of the communication system 1. First, a conventional communication system in which five ECUs are connected to a communication bus will be described. In the conventional communication system, when the turn of transmission comes, each ECU does not transmit a data frame if the transmission frame is not present in the IC storage unit 33. When a predetermined period has passed from the end of the transmission of the beacon signal, the second ECU waits until a further predetermined period passes if the first ECU has not transmitted the data frame. When the second ECU has not transmitted a data frame, the third ECU waits until a further predetermined period passes. Each of the remaining three ECUs similarly waits until the predetermined period passes. If the fifth ECU has not transmitted a data frame even after the predetermined period has passed, a beacon signal is transmitted again.

As a result, when there is no transmission frame in the IC storage unit 33 for each of the five ECUs, a beacon signal is transmitted each time the predetermined period passes five times, as shown on the upper side of FIG. 11. The beacon signal transmission interval is short. When the transmission interval is short, the number of times of switching the voltage of the communication bus B is large so that the voltage difference becomes a high level voltage or a low level voltage. When the voltage of the communication bus B is switched, disturbance noise is generated. When the number of switching times per unit time is large, the intensity of disturbance noise is high. In this case, there is a possibility that the signal output through the conducting wire different from the communication bus B, for example, an operating signal, will be erroneously read.

However, in the communication system 1, when there is no transmission frame in the IC storage unit 33 for each of the first ECU 11 and the four second ECUs 12, each of the first ECU 11 and the plurality of second ECU 12 always transmits a dummy frame as shown on the lower side of FIG. 11. Therefore, the transmission interval at which the beacon signal is transmitted is long. When the transmission interval is long, the number of times of switching the voltage of the communication bus B is small. In this case, the intensity of disturbance noise is low. As a result, the generation of high-intensity disturbance noise is prevented.

In the communication system 1, since all of the first ECU 11 and the four second ECUs 12 transmit dummy frames, the beacon signal transmission interval is very long. Therefore, the intensity of disturbance noise generated from the communication bus B is very low.

Even if the number of second ECUs 12 is not four, the communication system 1 has the same effects as the effects described above.

In addition, it is preferable that all bit values forming the main data of the dummy frame are the same. In this case, the number of times of voltage switching per unit time is even smaller.

Figure 12:
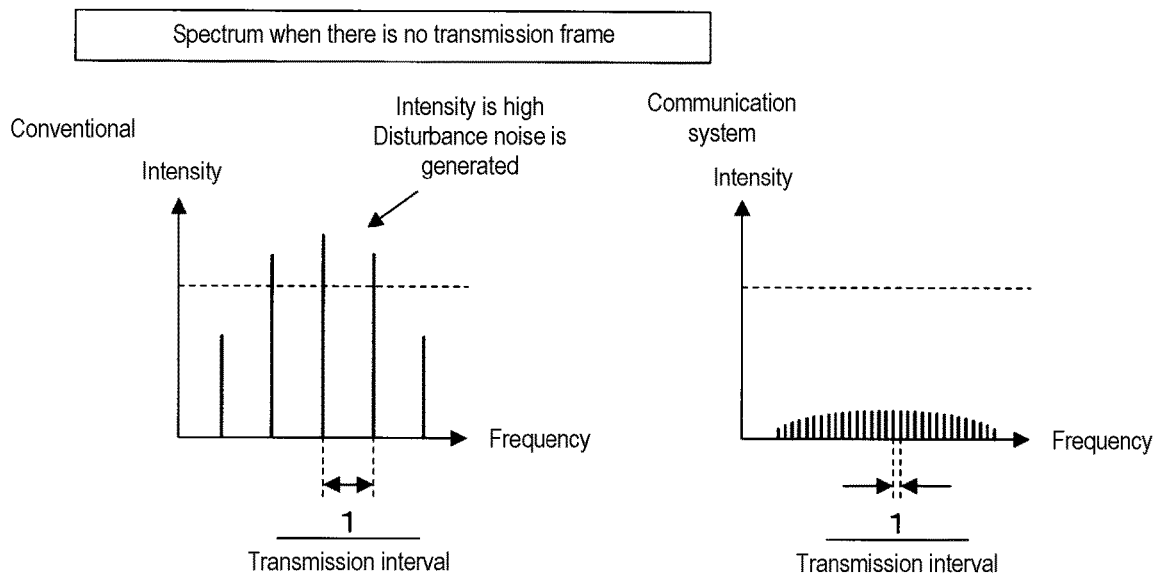
FIG. 12 is another explanatory diagram of the effects of the communication system.

FIG. 12 is another explanatory diagram of the effects of the communication system 1. Here, the effects of the communication system 1 will be described by using the spectrum of the signal (data) propagating through the communication bus B. In the conventional communication system, when there is no transmission frame in the IC storage unit 33 for each of the five ECUs, a beacon signal is transmitted each time a predetermined transmission interval passes. As a result, the same waveform is repeated periodically. In this case, the spectrum is excited at a frequency interval of (1/transmission interval). As for the conventional communication system, since the transmission interval is short, the frequency interval of the spectrum to be excited is large as shown on the left side of FIG. 12.

In the communication system 1, when there is no transmission frame in the IC storage unit 33 for each of the first ECU 11 and the second ECU 12, a beacon signal is transmitted each time a predetermined transmission interval passes, as in the conventional case. Therefore, the spectrum is excited at a frequency interval of (1/transmission interval). As for the communication system 1, since the transmission interval is long, the frequency interval of the spectrum to be excited is short as shown on the right side of FIG. 12.

For the conventional communication system, the number of spectra to be excited within a predetermined frequency range is small. For this reason, the intensity of each spectrum is high. As a result, there is a spectrum that acts as high-intensity disturbance noise. On the other hand, for the communication system 1, the number of spectra to be excited within the predetermined frequency range is large. For this reason, the intensity of each spectrum is low. Therefore, there is no spectrum that acts as high-intensity disturbance noise. As a result, the generation of high-intensity disturbance noise is prevented.

Second Embodiment

In the first embodiment, all ECUs connected to the communication bus B transmit dummy frames. This prevents the generation of high-intensity disturbance noise. However, the configuration for preventing the generation of high-intensity disturbance noise is not limited to the configuration in which all ECUs transmit dummy frames.

Hereinafter, the points of the second embodiment that are different from the first embodiment will be described. Since configurations other than those described later are the same as those of the first embodiment, the same components as in the first embodiment are denoted by the same reference numerals as in the first embodiment, and the description thereof will be omitted.

Data Frame Transmission Method

Figure 13:
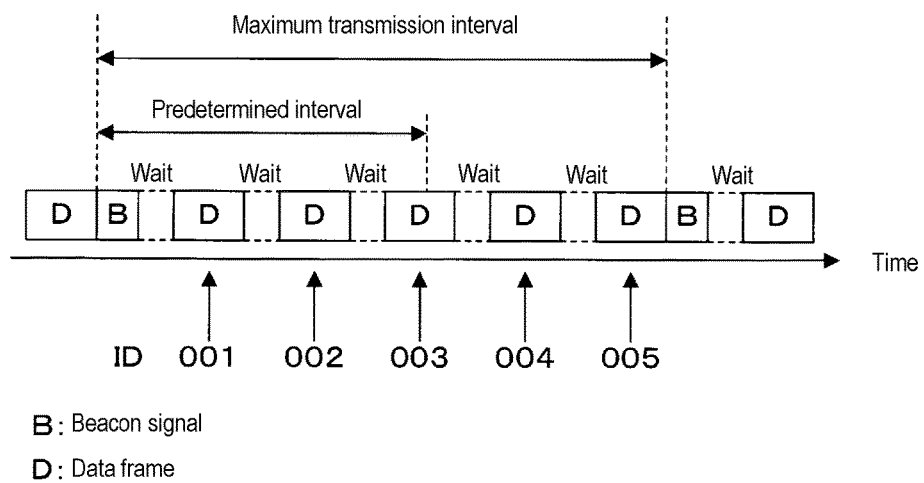
FIG. 13 is an explanatory diagram of a data frame transmission method according to a second embodiment.

FIG. 13 is an explanatory diagram of a data frame transmission method according to the second embodiment. FIG. 13 shows an example in which the first ECU 11 and the four second ECUs 12 transmit data frames. The IDs, roles, and transmission turns of the first ECU 11 and the four second ECUs 12 are determined as shown in FIG. 3.

In the communication system 1 according to the second embodiment, when the beacon signal transmission interval is equal to or longer than a predetermined interval, no disturbance noise having a high intensity is generated. The predetermined interval is a fixed value. In addition, the predetermined interval is shorter than the maximum transmission interval when all of the first ECU 11 and the four second ECUs 12 transmit data frames.

In the example of FIG. 13, when three ECUs among the first ECU 11 and the four second ECUs 12 transmit data frames, the transmission interval is equal to or longer than the predetermined interval. In this case, the remaining two ECUs do not need to transmit dummy frames.

The number of ECUs connected to the communication bus B in the communication system 1 is denoted as N below. N is an integer of 3 or more. N ECUs are formed by the first ECU 11 and the (N–1) second ECUs 12. The number of ECUs that transmit dummy frames is denoted as P. P is a natural number less than N. The number of ECUs that do not transmit dummy frames is denoted as Q. Q is a natural number, and is calculated by (N–P). In the example of FIG. 13, N, P, and Q are 5, 3, and 2 respectively.

As described above, when P ECUs transmit data frames, the beacon signal transmission interval is equal to or longer than the predetermined interval. Q ECUs do not need to transmit dummy frames. Each of the Q ECUs that do not transmit dummy frames may be any of the first ECU 11 and the (N–1) second ECUs 12.

Procedure for Transmitting Data Frame

The IC control unit 31 of the first ECU 11 that transmits a dummy frame performs transmission processing in the same manner as in the first embodiment. However, regarding step S21 of the transmission processing, when the predetermined period has passed, if the second ECU 12 whose turn is the last does not start the transmission of the data frame, the time when the predetermined period has passed is the timing at which the beacon signal is transmitted.

Figure 14:
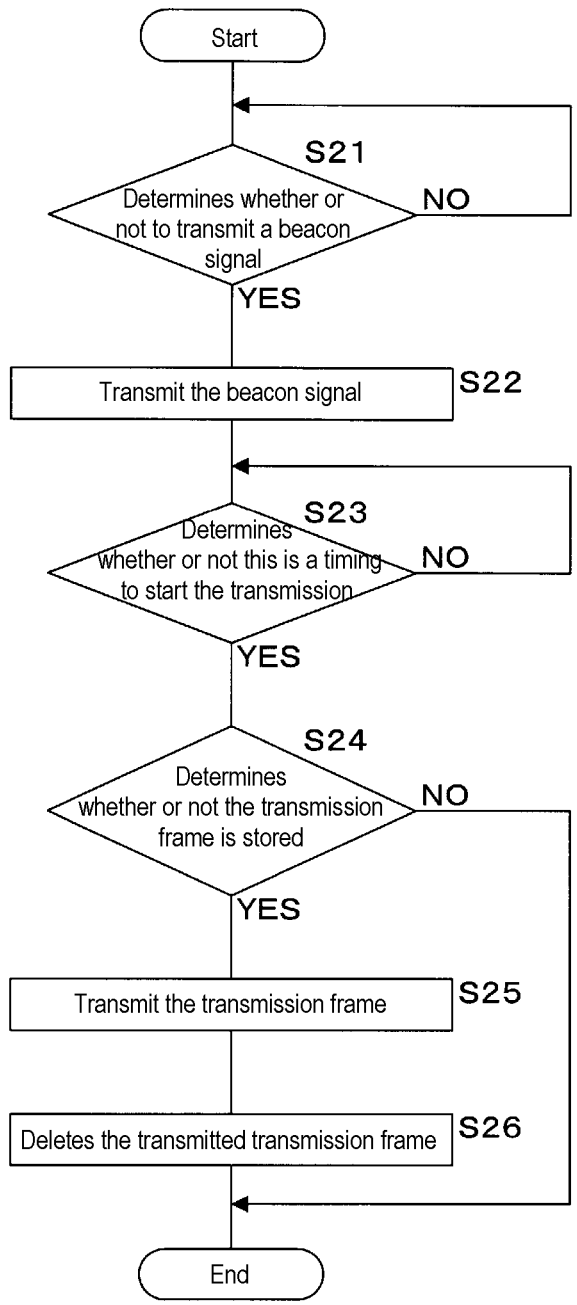
FIG. 14 is a flowchart showing the procedure of transmission processing performed by an IC control unit of the first ECU that does not transmit a dummy frame.

FIG. 14 is a flowchart showing the procedure of transmission processing performed by the IC control unit 31 of the first ECU 11 that does not transmit a dummy frame. In the transmission processing, the IC control unit 31 of the first ECU 11 that does not transmit a dummy frame similarly executes steps S21 to S26 of the transmission processing performed by the IC control unit 31 of the first ECU 11 that transmits the dummy frame. Therefore, the description of steps S21 to S26 will be omitted.

When it is determined that the transmission frame is not stored in the IC storage unit 33 (S24: NO), the IC control unit 31 of the first ECU 11 that does not transmit a dummy frame ends the transmission processing. After the transmission processing ends, the IC control unit 31 performs the transmission processing again.

The IC control unit 31 of the second ECU 12 that transmits a dummy frame performs transmission processing in the same manner as in the first embodiment. However, regarding step S33 of the transmission processing, when a predetermined period has passed, if the first ECU 11 or the second ECU 12 with an immediately preceding turn does not start the transmission of the data frame, the time when a further predetermined period has passed from the time when the predetermined period has passed a timing at which the transmission of the data frame is started.

Figure 15:
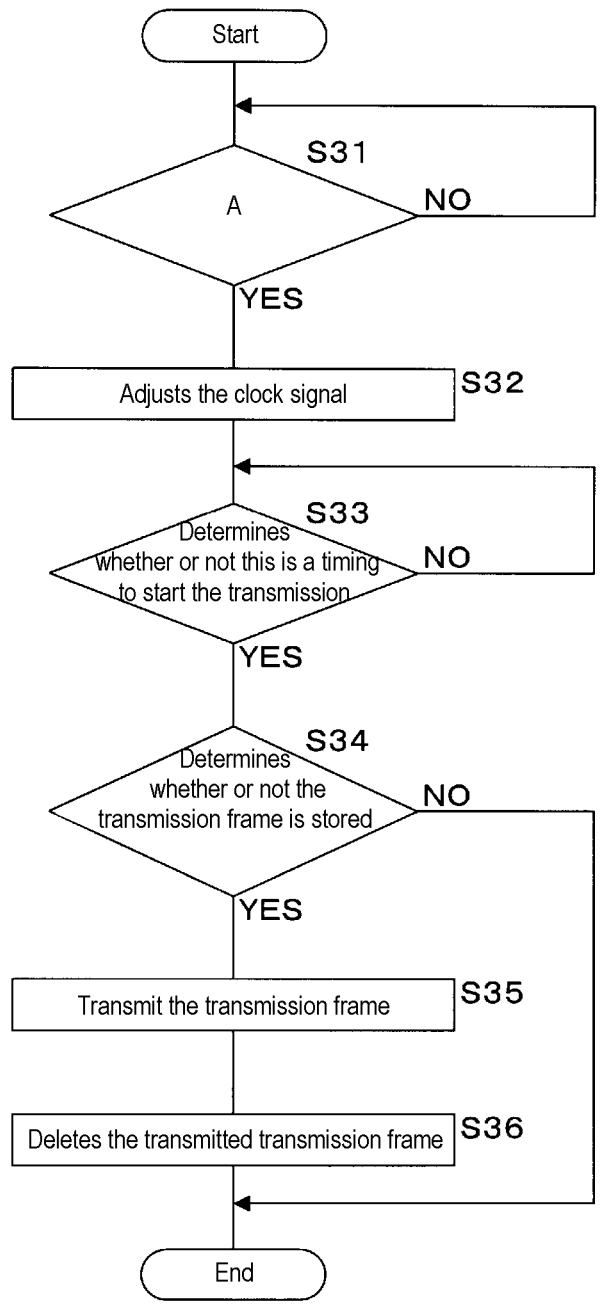
FIG. 15 is a flowchart showing the procedure of transmission processing performed by an IC control unit of the second ECU that does not transmit a dummy frame.

FIG. 15 is a flowchart showing the procedure of transmission processing performed by the IC control unit 31 of the second ECU 12 that does not transmit a dummy frame. In the transmission processing, the IC control unit 31 of the second ECU 12 that does not transmit a dummy frame similarly executes steps S31 to S36 of the transmission processing performed by the IC control unit 31 of the second ECU 12 that transmits the dummy frame. The description of steps S31 to S36 will be omitted.

When it is determined that the transmission frame is not stored in the IC storage unit 33 (S34: NO), the IC control unit 31 of the second ECU 12 that does not transmit a dummy frame ends the transmission processing. After the transmission processing ends, the IC control unit 31 performs the transmission processing again.

In the communication system 1 according to the second embodiment, when no transmission frame is present in the IC storage unit 33, each of the P ECUs transmits a dummy frame. When no transmission frame is present in the IC storage unit 33, each of the Q ECUs does not transmit a dummy frame.

When the first ECU 11 is included in the P ECUs, the IC control unit 31 of the first ECU 11 performs transmission processing in the same manner as in the first embodiment. When the first ECU 11 is included in the Q ECUs, the IC control unit 31 of the first ECU 11 performs transmission processing shown in FIG. 14.

When the second ECU 12 is included in the P ECUs, the IC control unit 31 of the second ECU 12 included in the P ECUs performs transmission processing in the same manner as in the first embodiment. When the second ECU 12 is included in the Q ECUs, the IC control unit 31 of the second ECU 12 included in the Q ECUs performs transmission processing shown in FIG. 15.

Effects of Communication System 1

In the communication system 1 according to the second embodiment, since the beacon signal transmission interval is maintained at a value equal to or greater than the predetermined interval by the P ECUs, the generation of high-intensity disturbance noise is prevented. When no transmission frame is present in the IC storage unit 33, the bit communicator 35 of each of the Q ECUs does not transmit the data frame. Therefore, efficient transmission of transmission frames is realized.

Third Embodiment

In the second embodiment, the bit communicators 35 of the Q ECUs do not necessarily need to transmit dummy frames when the transmission frame is not present in the IC storage unit 33.

Hereinafter, the points of the third embodiment that are different from the second embodiment will be described. Since configurations other than those described later are the same as those of the second embodiment, the same components as in the second embodiment are denoted by the same reference numerals as in the second embodiment, and the description thereof will be omitted.

Data Frame Transmission Method

FIG. 16 is an explanatory diagram of a data frame transmission method according to the third embodiment. FIG. 16 shows an example in which the first ECU 11 and the four second ECUs 12 transmit data frames. In the third embodiment, as in the second embodiment, when P ECUs transmit data frames, the beacon signal transmission interval is equal to or longer than a predetermined interval. In the example of FIG. 16, P is three.

In the communication system 1 according to the second embodiment, when no transmission frame is present in the IC storage unit 33, each of the P ECUs transmits a dummy frame. However, for example, when one of the Q ECUs transmits a transmission frame, (P−1) ECUs transmit dummy frames, thereby realizing a transmission interval equal to or longer than the predetermined interval.

In the communication system 1 according to the third embodiment, the last P second ECUs 12 function as ECUs that transmit dummy frames. The last P second ECUs 12 adjust the transmission interval so that the transmission interval becomes equal to or longer than the predetermined interval. In the example of FIG. 16, the three second ECUs 12 corresponding to 003 to 005 adjust the transmission interval. The data frame transmission turn of the bit communicator 35 of each of the P second ECUs 12 is the second or later.

FIG. 17 is a chart showing dummy frame transmission conditions. The transmission conditions shown in FIG. 17 correspond to the configuration of FIG. 16. That is, FIG. 17 shows the transmission conditions of the communication system 1 in which N, P, and Q are 5, 3, and 2, respectively. The Q ECUs include the first ECU 11 with an ID of 001 and the second ECU 12 with an ID of 002. When no transmission frame is present in the IC storage unit 33, the bit communicator 35 of each of the first Q ECUs does not transmit a dummy frame.

The P ECUs include the second ECUs 12 corresponding to 003 to 005. When no transmission frame is present in the IC storage unit 33, the second ECU 12 with an ID of 003 transmits a dummy frame when the number of data frames transmitted from the first Q ECUs is zero. When no transmission frame is present in the IC storage unit 33, the second ECU 12 with an ID of 003 does not transmit a data frame when the number of data frames transmitted from the first Q ECUs is one or more. When the number of data frames is one or more, the last (P−1) ECUs can adjust the transmission interval so that the transmission interval becomes equal to or longer than the predetermined interval.

When no transmission frame is present in the IC storage unit 33, the second ECU 12 with an ID of 004 transmits a dummy frame when the number of data frames transmitted from the first (Q+1) ECUs is one. When no transmission frame is present in the IC storage unit 33, the second ECU 12 with an ID of 004 does not transmit a data frame when the number of data frames transmitted from the first (Q+1) ECUs is two or more. When the number of data frames is two, the last (P−2) ECUs can adjust the transmission interval so that the transmission interval becomes equal to or longer than the predetermined interval. When the number of data frames is three (=P), the transmission interval is already equal to or longer than the predetermined interval. Therefore, it is not necessary to transmit a dummy frame.

When no transmission frame is present in the IC storage unit 33, the second ECU 12 with an ID of 005 transmits a dummy frame when the number of data frames transmitted from the first (Q+2) ECUs is two. When no transmission frame is present in the IC storage unit 33, the second ECU 12 with an ID of 004 does not transmit a data frame when the number of data frames transmitted from the first (Q+2) ECUs is three (=P) or more. When the number of data frames is three or more, the transmission interval is already equal to or longer than the predetermined interval. Therefore, it is not necessary to transmit a dummy frame.

Procedure for Transmitting Data Frame

In the communication system 1 according to the third embodiment, the bit communicator 35 of the first ECU 11 does not transmit a data frame when no transmission frame is present in the IC storage unit 33. Therefore, the IC control unit 31 of the first ECU 11 in the third embodiment performs the transmission processing shown in FIG. 14.

When no transmission frame is present in the IC storage unit 33, the bit communicator 35 of the second ECU 12 with an ID of 002 does not transmit a dummy frame. The IC control unit 31 of the second ECU 12 that does not transmit a dummy frame performs the transmission processing shown in FIG. 15 in the same manner as in the second embodiment.

FIG. 18 is a flowchart showing the procedure of transmission processing performed by the IC control unit 31 of the second ECU 12 that transmits a dummy frame. In the transmission processing, the IC control unit 31 of the second ECU 12 that transmits a dummy frame similarly executes steps S31 to S36 of the transmission processing performed by the IC control unit 31 of the second ECU 12 of the second embodiment that transmits the dummy frame. Therefore, the description of steps S31 to S36 will be omitted.

In the transmission processing, when it is determined that no transmission frame is stored in the IC storage unit 33 (S34: NO), the IC control unit 31 of the second ECU 12 that transmits a dummy frame determines whether or not to transmit a dummy frame based on the number of data frames transmitted through the communication bus B until the turn of transmission of the data frame comes after the beacon signal is transmitted (step S41). For example, in step S41 of the transmission processing of the second ECU 12 with an ID of 003, as shown in FIG. 17, the IC control unit 31 determines that the dummy frame is to be transmitted when the number of data frames transmitted from the first Q ECUs is zero. When the number of data frames transmitted from the first Q ECUs is one or more, the IC control unit 31 determines that the dummy frame is not to be transmitted.

Even in a configuration in which the amount of data included in the data field of the data frame changes, the data amount of one data frame is substantially constant because the amount of change is small. Therefore, the number of data frames transmitted through the communication bus B corresponds to the data amount of data transmitted through the communication bus B. The IC control unit 31 functions as a determination unit.

When it is determined that the dummy frame is to be transmitted (S41: YES), the IC control unit 31 instructs the bit communicator 35 to transmit a dummy frame stored in the IC storage unit 33 bit by bit (step S42). When it is determined that the dummy frame is not to be transmitted (S41: NO) or after executing step S42, the IC control unit 31 ends the transmission processing. After the transmission processing ends, the IC control unit 31 performs the transmission processing again.

Effects of Communication System 1

Since the bit communicator 35 of each of the P second ECUs 12 transmits a dummy frame as necessary, the dummy frame is efficiently transmitted. The communication system 1 according to the third embodiment has the same effects as those of the communication system 1 according to the second embodiment.

Modification Examples of Third Embodiment

In the third embodiment, when the variation width of the data amount of the data frame is large, the IC control unit 31 of the second ECU 12 that transmits a dummy frame may execute step S41 of the transmission processing as follows. In step S41, the IC control unit 31 determines whether or not to transmit a dummy frame based on the data amount of data transmitted through the communication bus B until the turn of transmission of the data frame comes after the beacon signal is transmitted.

As described above, in the third embodiment, two types of ECUs are connected to the communication bus B. These are an ECU that does not transmit a dummy frame and an ECU that determines whether or not to transmit a dummy frame based on the data amount of data transmitted through the communication bus B when there is no transmission frame. In the communication system 1 according to the third embodiment, as described in the first and second embodiments, an ECU that always transmits a dummy frame when there is no transmission frame may be connected to the communication bus B. In addition, in the third embodiment, when P is 1, the second ECU 12 is not included in the P ECUs.

Modification Examples of First to Third Embodiments

In each of the first ECU 11 and the second ECU 12 in the first to third embodiments, the device control unit 25 may perform the transmission processing instead of the IC control unit 31. In addition, in each of the first ECU 11 and the second ECU 12, the device control unit 25 and the IC control unit 31 may cooperate with each other to perform the transmission processing. In addition, the transmission destination of the dummy frame may be the transmission source. In this case, when a data frame is received, each of the first ECU 11 and the plurality of second ECUs 12 discards the received data frame if the transmission destination and the transmission source of the received data frame are the same. In addition, the device connected to the communication bus B is not limited to the ECU. There is no problem as long as the device connected to the communication bus B is a communication device that transmits data through the communication bus B.

The method of grasping the timing at which the transmission of the data frame ends is not limited to the method based on the data length. When an EOF field indicating the end of transmission is provided at the end of the data frame, the timing at which the transmission of the EOF field ends is the timing at which the transmission of the data frame ends. EOF is an abbreviation for End Of Frame. The waveform of the EOF field is set in advance.

It should be considered that the first to third embodiments disclosed are examples in all points and not restrictive. The scope of the present disclosure is defined by the claims rather than the meanings set forth above, and is intended to include all modifications within the scope and meaning equivalent to the claims.

The invention claimed is:

1. A communication device to be mounted in a vehicle to transmit data, comprising:
a transmission unit that is to be connected to a communication bus to which a plurality of second communication devices are to be connected and transmits data,
wherein an order in which the plurality of second communication devices and the transmission unit transmit data through the communication bus is set in advance,
a beacon signal indicating a start of data transmission is repeatedly transmitted through the communication bus,
the transmission unit transmits data according to the order when the beacon signal is transmitted,
the transmission unit transmits dummy data whose transmission destination is different from the plurality of second communication devices when there is no transmission data to be transmitted to the second communication devices, and
a determination unit is provided that determines whether or not to transmit the dummy data based on a data amount of data transmitted through the communication bus, until a data transmission turn comes after the beacon signal is transmitted, when the transmission data is not present.

2. The communication device according to claim 1, wherein a configuration of the transmission unit conforms to 10BASE-T1S of IEEE802.3cg.

3. A communication system, comprising:
a plurality of communication devices to be connected to a communication bus,
wherein one of the plurality of communication devices repeatedly transmits a beacon signal indicating a start of data transmission through the communication bus,
when the beacon signal is transmitted, the plurality of communication devices transmit data through the communication bus according to an order set in advance,
at least one of the plurality of communication devices transmits dummy data whose transmission destination is different from the remaining communication devices when there is no transmission data to be transmitted to one of the remaining communication devices other than itself, and
when the transmission data is not present, at least one of the plurality of communication devices determines whether or not to transmit the dummy data based on a data amount of data transmitted through the communication bus until a data transmission turn comes after the beacon signal is transmitted.

4. The communication system according to claim 3, wherein each of the plurality of communication devices transmits the dummy data when the transmission data is not present.

5. The communication system according to claim 3, wherein at least one of the plurality of communication devices does not transmit data through the communication bus when the transmission data is not present.

6. A communication method of a communication device for transmitting data,
wherein the communication device is to be connected to a communication bus to which a plurality of second communication devices are to be connected,
an order in which the communication device and a plurality of second communication devices transmit data through the communication bus is set in advance,
a beacon signal indicating a start of data transmission is repeatedly transmitted through the communication bus, and
the communication device executes:
a step of transmitting data according to the order when the beacon signal is transmitted;
a step of transmitting dummy data whose transmission destination is different from the plurality of second communication devices when there is no transmission data to be transmitted to the second communication devices; and
a step of determining whether or not to transmit the dummy data based on a data amount of data transmitted through the communication bus, until a data transmission turn comes after the beacon signal is transmitted, when the transmission data is not present.

* * * * *